Feb. 6, 1951 | A. C. FISCHER | 2,540,251

CONTRACTION JOINT FOR CONCRETE

Filed Feb. 26, 1945 | 3 Sheets-Sheet 1

INVENTOR.
ALBERT C. FISCHER
BY
Albert H. Robinson
ATTORNEY

Feb. 6, 1951 A. C. FISCHER 2,540,251

CONTRACTION JOINT FOR CONCRETE

Filed Feb. 26, 1945 3 Sheets-Sheet 2

INVENTOR.
ALBERT C. FISCHER

BY

Albert H. Robinson

ATTORNEY

Feb. 6, 1951 A. C. FISCHER 2,540,251
CONTRACTION JOINT FOR CONCRETE
Filed Feb. 26, 1945 3 Sheets-Sheet 3

INVENTOR.
ALBERT C. FISCHER
BY
Albert F. Robinson
ATTORNEY

Patented Feb. 6, 1951 2,540,251

UNITED STATES PATENT OFFICE 2,540,251

CONTRACTION JOINT FOR CONCRETE

Albert C. Fischer, Chicago, Ill.; Wallace C. Fischer and Cecile G. Fischer, executors of said Albert C. Fischer, deceased, assignors to Servicised Products Corporation, a corporation of Illinois Application February 26, 1945, Serial No. 579,761

7 Claims. (Cl. 94—18)

This invention relates to contraction joints embedded in concrete pavements as a means whereby cleavage of a section of pavement under internal stresses of contraction may be restricted to desirable geometrical lines and in rationally distributed vertical planes of subdivision, rather than along irregular lines, at random. While the need for such contraction joints is perhaps greatest along the center line of a roadway, they are desirable also in transverse positions, paralleling but suitably spaced from expansion joints that will likewise be employed.

One object of the invention is to provide suitable constructions of thin subdivision plates which, by extending through a suitable proportion of the vertical dimension of the paving slab or entirely through the same in certain selected plates will enable the slab under stresses of contraction developing therein, to pull apart in said planes rather than elsewhere; it being contemplated that such plates may be left permanently in position in the concrete or withdrawn therefrom and replaced by a poured filler as may be desired. Such plates may be made of thin metal such as sheet steel; strips of resinized lignin or other preserved board; wood veneer coated on one or both sides with saturated felt or paper, sheeting formed of pressed sawdust with a resinous binder; thin mastic material preferably housed between layers of felt; mineral wool sheeting filled with Portland cement; a strip of asbestos lumber or a sheet of asbestos cement or in fact any non-perishing material capable of maintaining inherent rigidity and strength admitting of manipulation into the position of and serving the functions of the division template for two adjacent poured concrete slabs. These plates, especially if made of sheet steel, are preferably provided with a protective coating of rubberized bituminous material. They may be formed by pressing or rolling with any desired sectional form such as corrugated or other form that will contribute to their integrity and adapt them to better coact with means for holding them in erect position while the concrete is being poured.

Another object of this invention is to provide constructions of contraction joint plates that will enable them to be made in two assembled sections separable along a horizontal line and both of which may be left permanently in the position of a cleavage defining plane in the concrete, or the upper one of which may be withdrawn after the concrete has set, while the lower section is left permanently in such position; said sections being provided with means facilitating their assembly in functioning position or their separability and release of the upper section when desirable.

Another object of the invention is to provide waterstop means in association with any of the various types of contraction joint plates herein contemplated; some of said waterstop means being adapted for association in general with a cleavage defining plate; some of them being especially designed for association with plates having separable sections, the upper one of which is removable; and others being combined with subdivisible cleavage plates in a manner to assist in the assembly of the two plate sections; to pack the joint between the sections when assembled; and to serve as a waterstop upon the lower section that remains permanently in place and prevents water from reaching the foundation of the pavement after the upper section of the cleavage plate is withdrawn.

It is a further object of the invention to provide contraction joint plates formed of a rubberized bituminous material having a high degree of adhesive tenacity, distendability and recuperative properties after stretching, which properties remain effective at extremely low temperatures and temperatures ranging as low as 0° F. Furthermore the invention contemplates the provision of waterstops employed in conjunction with the contraction joint plates formed of the same material so that effective seals are provided for the contraction joints when the contraction forces in the pavement sections are of sufficient extent to effect a separation between the pavement sections. The composition of this rubberized bituminous material is fully disclosed in co-pending applications, Serial No. 471,503, filed January 6, 1943, now Patent No. 2,454,506, and Serial No. 575,935, filed February 2, 1945, now Patent No. 2,511,830. In the latter patent a preferred embodiment of the composition is specified as formed of the following ingredients:

Kempol #54—32.6% (26% to 35%)
Trumbull Asphalt B—38.0% (35% to 45%)
Servicised Flux—21.6% (16% to 25%)
Clay—4.0% (3% to 5%)
Asbestos—1.1% (0.5% to 1.5%)
Zonolite—2.7% (1.5% to 3.5%)

The Trumbull Asphalt B, marketed by the Trumbull Asphalt Company, has the following properties:

| | | |
|---|---|---|
| Melting point (A. S. T. M. Ring and Ball) | F | 175°–190° |
| Ductility (A. S. T. M. 77° F. 5 cm. per min.) | cm | 4–8 |
| Penetration (77° F. 100 gms. 5 sec's. A. S. T. M.) | cm | 0.12–0.20 |
| Penetration (32° F. 200 gms. 60 sec's. A. S. T. M.) | cm | 0.22–0.18 |

The Servicised Flux is an oily asphalt of a viscous liquidy nature of the type from which the heavier asphalts are blown, characterized by the following properties:

| | | |
|---|---|---|
| Ductility—77° F. 5 cm. per min | cm | 45 to 60 |
| Penetration—32° F. 200 gms. 60 sec | cm | 66 |

The material is too soft to take a penetration at 77° F. with a standard needle, and is also too soft to take a melting point reading with ring and ball.

Other objects and purposes will appear from the more detailed description of the invention following hereinafter, taken in conjunction with the accompanying drawings, wherein Fig. 1 is a perspective view of a portion of a contraction joint assembly, the upper portion of which is adapted to be removed following the pouring of the concrete sections;

Figure 2:
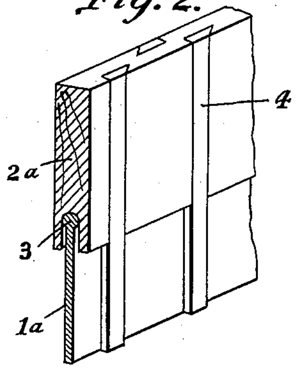
Fig. 2 is a perspective view of a different embodiment of the invention utilizing special retaining means for the contraction plate of the rubberized bituminous material contemplated herein.
Figure 3:
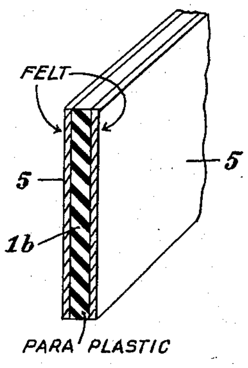
Fig. 3 is a perspective veiw of a contraction plate formed of a sheet of the rubberized bituminous material covered with sheets of felt on the opposite faces thereof.
Figure 3A:
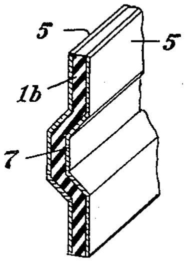
Figure 4:
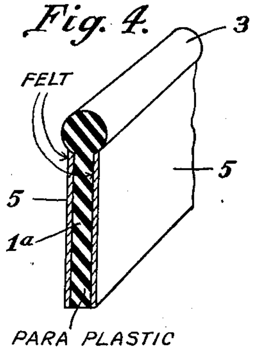
Figure 5:
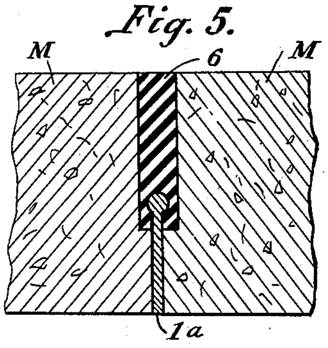
Figure 6:
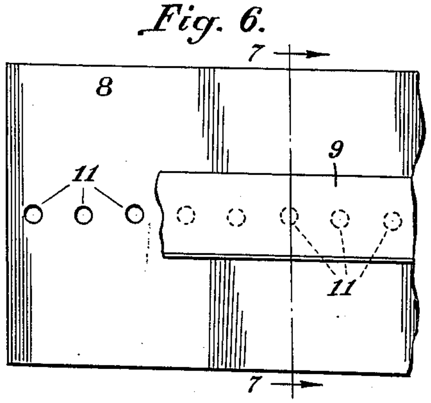
Figure 7:
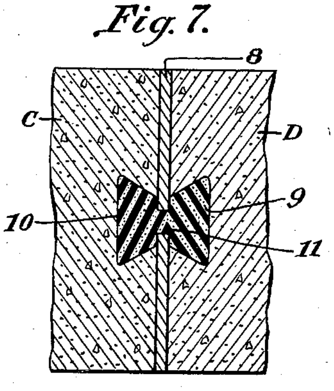
Figure 8:
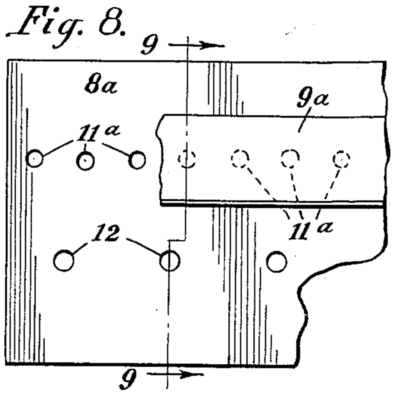
Figure 9:
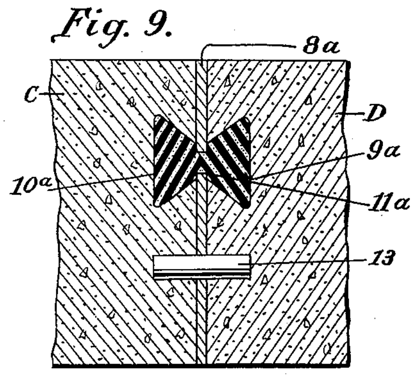
Figure 10:
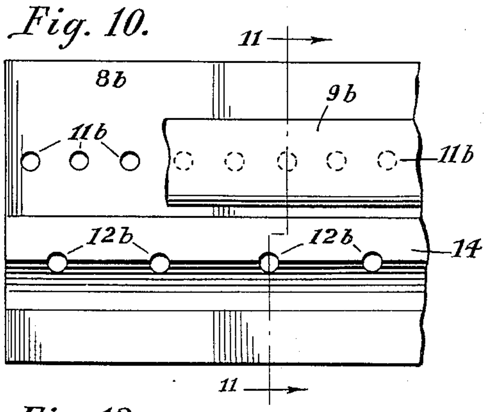
Figure 11:
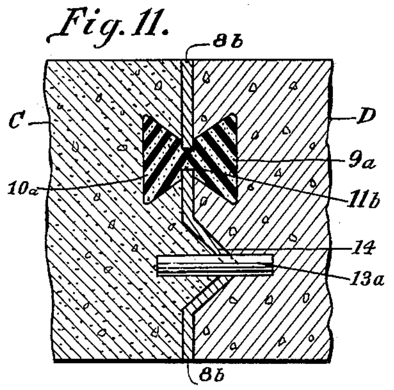
Figure 12:
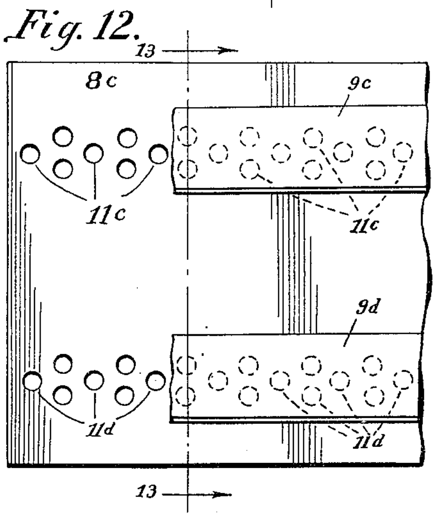
Figure 13:
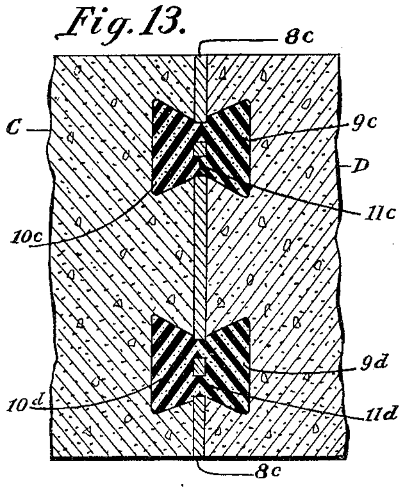
Figure 14:
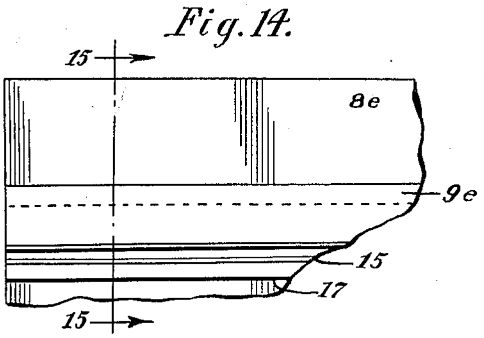
Figure 15:
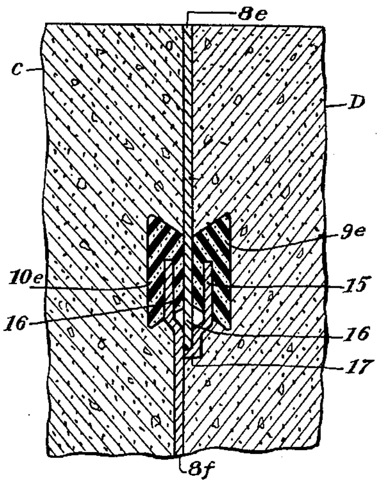

Fig. 3*a* shows a different embodiment of the contraction plate shown in Fig. 3, embodying an offset portion to impart a degree of stability to the plate in the course of its setting up, which also serves to interlock the two concrete sections by the resulting offset portion, against relative vertical movement;

Fig. 4 shows a variation of Fig. 3 embodying a rounded bead at the top thereof for cooperation with a retaining device which may be of the type shown in Fig. 2;

Fig. 5 is a vertical sectional view of a pair of pavement sections separated by a contraction plate of the type shown in Figs. 2 and 4 following the removal of the retaining plate and the filling of the upper portion of the joint with a sealing compound;

Figs. 6 and 7 are, respectively, an elevational view and a section on the line 7—7 of Fig. 6, showing a portion of a non-divisible cleavage plate together with a portion of one of two wings of a water-stop secured in position on opposite sides of a cleavage plate, formed of rubberized bituminous material which is adhesive, plastic and distendable and which retains these properties at temperatures as low as 0° F.;

Figs. 8 and 9 are, respectively, an elevational view similar to Fig. 6 and a section on the line 9—9, Fig. 8, showing the cleavage plate with a second row of holes appropriate to the reception of pins conventionally used for anchoring expansion joint cores or other forms of template for defining the metes and bounds of concrete sections and which may be desirably used in anchoring contraction joint plates as well;

Figs. 10 and 11 are, respectively, an elevational view similar to Fig. 8 and a section on the line 11—11 of Fig. 10, illustrating the use of an angular lateral deflection in the cleavage plate, that gives form to a tongue-and-groove joint between the two slabs of concrete as a limitation of vertical relative movement between said slabs in case of impairment of their foundations; and, incidentally using the apex of said deflection as the locus of anchoring pins if and when said pins are employed;

Figs. 12 and 13 are, respectively, an elevational view and a section on the line 13—13 of Fig. 12 illustrating the use of a plurality of vertically spaced waterstops of rubberized bituminous material of the same general type as that employed in Figs. 6 to 11 inclusive;

Fig. 14 is an elevational view of a portion of a divisible cleavage plate for contraction joints together with a portion of a waterstop that packs the connection between the plate sections and helps to hold said sections releasably in assembly; and Fig. 15 is a sectional view of two slabs of concrete having their plane of cleavage defined by the plate of Fig. 14, and packed by the waterstop thereof; the plane of section of said plate and waterstop being indicated by the line 15—15 of Fig. 14.

Figs. 16 to 20 are perspective views of contraction joints, each having an offset portion and embodying a rubberized bituminous composition in a part thereof.

Figure 1:
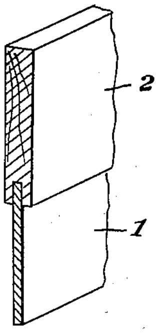

In the drawings, Fig. 1 illustrates the upper and lower sections of a two-part cleavage plate for contraction joints in which the lower part 1 is formed of a rolled sheet of rubberized bituminous material which is comparatively thin, of a range of thickness of less than ¼". This material maintains its adhesive and plastic characteristics at sub-freezing temperatures. The upper part of the cleavage plate 2, which may be formed of wood, and functions as a molding board or core, is slotted at its bottom edge to accommodate the top edge of the contraction plate and the member 2 is adapted to be removed following the pouring of the concrete sections and the retention of the contraction plate 1 therebetween. The space occupied by the molding board may be filled with a suitable plastic mass. The plate 1 permits the concrete sections to move apart in response to contractile forces without causing a cracking of the concrete.

In view of the character of the material employed for the contraction plate, which is somewhat pliable, particularly in warm weather, special supporting means for the plate may be necessary in order to retain the same in position in the course of pouring of the concrete. Fig. 2 illustrates such a modified arrangement, wherein the contraction plate 1*a*, formed of the rubberized bituminous material, is provided with a rounded bead 3 at the upper edge thereof, which is seated in a widened slot of the lower edge of the positioning member 2*a*, which, in addition, is provided with laterally disposed aligning members 4 which may be of steel or other metal, dove-tailed into the member 2*a* and extending beyond the lower edge thereof in order to provide staggered aligning guides for positioning the contraction plate 1*a*. The member 2*a*, with its aligning bars 4, may be withdrawn from the concrete following the pouring thereof before the same becomes completely set.

In Fig. 3 is shown a modified form of contraction plate in which a thin sheet of rubberized bituminous material 1b, described above, is faced with sheets of felt or other flexible sheeting material which is suitably waterproofed before or after its application to the core layer 1b. Fig. 3a shows this sheet of material provided with an offset portion 7 which strengthens the sheet against transverse bending and which in its operative position serves to mold the concrete sections with an interlocking portion to prevent relative vertical movement of the concrete sections while permitting to and fro movements as a result of the contraction of the pavement sections. If desired, more than one of the offset portions 7 may be provided in the contraction plate at different levels thereof. As described above, the plate with its sheet facings is of small dimension, in the vicinity of $\frac{3}{16}''$ and of less thickness than $\frac{1}{4}''$.

In Fig. 4 is shown a contraction plate formed of rubberized bituminous material faced with felt sides embodying, in addition, a rounded beading 3 at the top edge thereof, which may be used in cooperation with a setting device 2a as shown in Fig. 2 of the drawings.

Fig. 5 shows the completed contraction joint formed of the contraction plate 1a of rubberized bituminous material between the slabs of masonry M and including a mass of plastic material 6 which has been poured into the space formerly occupied by the setting or positioning device 2a. The mass of plastic material may be the same rubberized bituminous material of which the plate 1a is formed, which may be poured into the space provided therefor in a heated condition, or may assume the form of any other known sealing media.

According to Figs. 6 and 7, the cleavage plate 8 may be made as a single sheet of any of the materials mentioned above, such as thin metal which may be exemplified by sheet steel, wood veneer coated at least on one side thereof with a felt sheeting saturated with a rubberized bituminous composition of the type disclosed herein, or any other waterproofing material, strips of asbestos cement or sheets of mineral wool filled with Portland cement. Waterstop wings 9, 10 (Figs. 6 and 7), may be molded to the opposite faces of the cleavage plate and their interattachment may be reenforced by having portions of the wings restricted in section, project into openings 11 and adhere together where they meet by the hot pouring of waterstop wings on each side of the openings 11, whereupon the wings are integral at those openings and also adhere to the opposite faces of the cleavage plate 8 of the same material or different material such as metal, asbestos, waterproofed wood, veneer, felt covered mastic or the like. If desired to obtain the advantages of an offset portion, these sheets of different materials may be so formed as shown in Fig. 3a, or of a different offset contour. In the case of a cleavage plate formed of a sheet of felt coated wood veneer, the felt sheets on the opposite faces of the wood veneer may protrude beyond the veneer at the top and bottom edges thereof and the spaces therebetween may be filled with the rubberized bituminous plastic filler of the type described above.

According to Figs. 8 and 9, wings 9a, 10a on plates 8a may be associated on the same plate, with anchor pins 13 set in perforations 12, thus relieving the wings of destructive shear that might result from relative vertical movement between the slabs of concrete.

In Figs. 10 and 11 the cleavage plate 8b is laterally deflected, angularly as suggested at 14 in order to mold the two slabs of concrete with a tongue-and-groove assembly which has the effect of limiting vertical relative movement between the slabs. This control over the slabs is in addition to that afforded by pins 13a in holes 12b located along the apex of the angular deflection.

As illustrated in Figs. 12 and 13, a pair of wings of rubberized bituminous material 9d, 10d, molded to the plate and united together through holes 11d to form a second waterstop, effective for preventing water from rising up from below, may be employed in addition to the first waterstop 9c, 10c united through holes 11c and arresting water entering from above, thus exemplifying the principle of a multiple waterstop cleavage plate.

Figs. 14 and 15 illustrate a modified design of waterstop cleavage plate made of a plurality of releasably assembled sections. Here the lower plate section 8f is formed with a groove 15, 15, having a supporting step 17 at the bottom, and the upper section 8e has its meeting edge formed as a tongue 16 entering said groove, and snugly fitting in said step 17 independently of the waterstop, while waterstop rubberized bituminous material 9c, 10c is so introduced between the walls 15, 15 of the groove and the tongue 16 above the step 17, as to pack the connection against lost motion and seal it against seepage of water.

The waterstop wings shown on the various figures, formed of special material having pronounced adhesive as well as distendability and recuperative characteristics even at extremely low temperatures, constitute effective waterstops since their outwardly enlarging sections in the matrices that form about them in the concrete cause them to press water tight against the confines of the matrices, under contraction of the concrete and to resume positions in which they fill such matrices when the concrete expands again.

Figs. 16 to 20 illustrate different embodiments of contraction joints or cleavage plates, generally mentioned above, provided with an off-set portion to enhance the rigidity of the plate.

Figure 16:
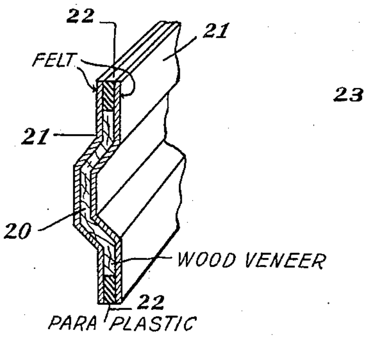

Fig. 16 shows the contraction plate formed of a thin wood veneer 20, the thickness of which is exaggerated for the purpose of illustration, covered on opposite sides with felt sheet 21 adhesively attached thereto and provided with portions protruding beyond the edges of the wood veneer for the purpose of accommodating masses 22 of rubberized bituminous material of the properties and compositions generally described above.

Figure 17:
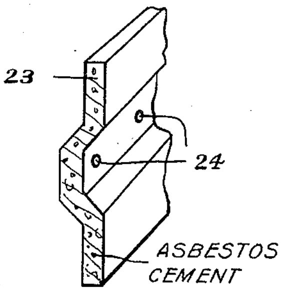

In Fig. 17, the contraction plate 23 is illustrated as formed of asbestos cement, having an approximate thickness of less than $\frac{1}{4}''$, which may be provided with apertures 24 to assist in the setting of the plate in the course of the pouring of the concrete at the time of fabrication of the payment or roadway.

Figure 18:
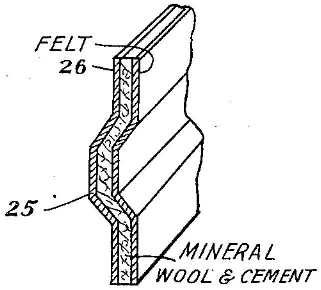

In Fig. 18, a sheet 25 of mineral wool interspersed in a body of Portland cement may be employed as the contraction plate either as a unitary body or one coated with felt sheets 26 on the opposite faces thereof.

Figure 19:
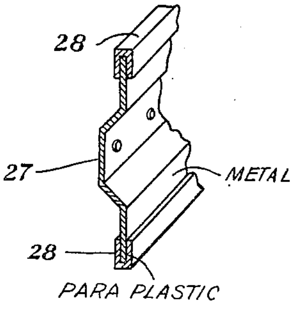

In Fig. 19, a metallic contraction plate 27 may be capped on the upper and lower edges with strips of Para-Plastic material 28 to effect a seal at the base and top of the contraction joint.

Adhesion between the sheets 28 takes place both at the metallic plate and at the walls of the pavement section so that a distendable seal at both the top and bottom of the joint is attained.

Figure 20:
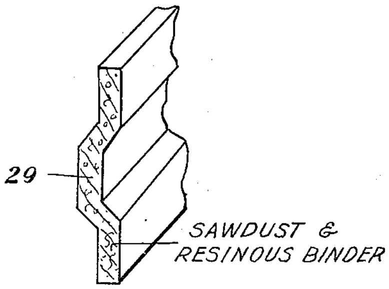

In Fig. 20, the contraction plate 29 is shown formed of sawdust with a resinous binder. In this case as well, the strip may be covered with sheets of felt or may be dipped in Para-Plastic material.

In all of the illustrated showings of the contraction plates in Figs. 16 to 20, the same are of small thickness and in all cases less than ¼″.

This case is a continuation-in-part of my application Serial No. 387,743, filed April 9, 1941, Patent No. 2,370,153, February 27, 1945.

I claim:

1. In concrete pavements, a contraction joint comprising a composition plate dividing the concrete in sections formed of a rubberized bituminous composition characterized by a high degree of adhesive tenacity, distendability and recuperative power, which properties are retained at sub-freezing temperature, and having the dividing plate provided with a rounded top edge superposed by a molding board having a recess in the bottom edge thereof for engaging said top edge and thereby positioning the dividing plate, and staggered downwardly extending bars on opposite sides of said dividing plate for retaining said plate in place during the concrete pouring operations.

2. In concrete pavements, a contraction joint comprising a composition plate dividing the concrete in sections formed of a rubberized bituminous composition characterized by a high degree of adhesive tenacity, distendability and recuperative power, which properties are retained at sub-freezing temperature, and having the dividing plate superposed by a molding board having a recess in the bottom edge for detachably engaging the top edge of the dividing plate, and staggered downwardly extending bars on opposite sides of said dividing plate for retaining said plate in place during the concrete pouring operations.

3. In concrete pavements, a contraction joint comprising a plate-like subdivider embedded in the concrete and defining a plane of cleavage therein; said subdivider comprising upper and lower sections, separable following the pouring of the concrete in a substantially horizontal plane; the upper section being removable from between the sections of concrete which it separates, while the lower section formed of a rubberized bituminous sheet of adhesive and distendable material remains embedded in and in contact with the concrete.

4. In concrete pavements, a contraction joint comprising a composition plate for dividing the concrete into sections and composed of 26 to 35% polymerized oil; 35 to 45% asphalt; 16 to 25% crude oil; and 5 to 10% filler, and having a pouring fluidity between 160° and 400° F. and characterized by a high degree of adhesize tenacity, distendability and recuperative power, which properties are retained at sub-freezing temperatures.

5. In concrete pavements, a contraction joint comprising a composition plate for dividing the concrete into sections and having a pouring fluidity between 160° and 400° F. and characterized by a high degree of adhesive tenacity, distendability and recuperative power, which properties are retained at sub-freezing temperatures, said composition being composed of the following ingredients in the respective proportions:

| | Per cent |
|---|---|
| Polymerized oil | 26 to 35 |
| Asphalt B obtained from refining petroleum | 35 to 45 |
| Crude oil | 16 to 25 |
| Clay | 3 to 5 |
| Asbestos | 0.5 to 1.5 |
| Exfoliated mica | 1.5 to 3.5 |

6. In concrete pavements, a contraction joint comprising a composition plate for dividing the concrete into sections embodying in its surface structure a rubberized composition having a pouring fluidity between 160° F. and 440° F. characterized by a high degree of adhesive tenacity, distendability and recuperative powers, which properties are retained at sub-freezing temperatures, said dividing plate being superposed by a molding plate which is provided with a recess in the bottom edge thereof for detachably engaging the top edge of the dividing plate, and downwardly extending bars on the sides of the dividing and molding plates for retaining same in place during the concrete pouring operation.

7. In concrete pavements, a contraction joint comprising a composition plate for dividing the concrete into sections embodying in its surface structure a rubberized compositon having a pouring fluidity between 160° F. and 440° F. characterized by a high degree of adhesive tenacity, distendability and recuperative powers, which properties are retained at sub-freezing temperatures, said dividing plate being superposed by a molding plate which is provided with a recess in the bottom edge there of for detachably engaging the top edge of the dividing plate, and downwardly extending bars for retaining said plate in place during the concrete pouring operation.

ALBERT C. FISCHER.

REFERENCES CITED

The following references are of record in the file of this patent:

UNITED STATES PATENTS

| Number | Name | Date |
|---|---|---|
| Re. 15,840 | Riehle | May 13, 1924 |
| 1,558,799 | Fischer | Oct. 27, 1925 |
| 1,570,970 | Milar | Jan. 26, 1926 |
| 1,694,213 | Fischer | Dec. 4, 1928 |
| 1,728,114 | Fischer | Sept. 10, 1929 |
| 1,763,369 | Robertson | June 10 ,1930 |
| 2,120,725 | Zanin | June 14, 1938 |
| 2,125,857 | Fischer | Aug. 2, 1938 |
| 2,244,337 | Isett | June 3, 1941 |
| 2,311,286 | Tufts | Feb. 16, 1943 |
| 2,339,556 | Greenup | Jan. 18, 1944 |
| 2,368,650 | Fischer | Feb. 6, 1945 |
| 2,370,153 | Fischer | Feb. 27, 1945 |
| 2,370,647 | Fischer | Mar. 6, 1945 |
| 2,374,186 | Fischer | Apr. 24, 1945 |